United States Patent [19]

Brokaw

[11] 4,012,866
[45] Mar. 22, 1977

[54] METHOD OF ROOT STOCK PROPAGATION

[76] Inventor: William Henley Brokaw, 9462 Telephone Road, Ventura, Calif. 93003

[22] Filed: Mar. 1, 1976

[21] Appl. No.: 662,519

[52] U.S. Cl. .................................................. 47/6
[51] Int. Cl.² ...................................... A01G 1/06
[58] Field of Search .................................. 47/6, 58

[56] References Cited

OTHER PUBLICATIONS

Dwarfed Fruit Trees, Tukey, 1964, Macmillan Co. N.Y., pp. 255–256.
Plant Propagation, Hartmann et al., 1968, prentice–Hall Inc., N.J., pp. 435–437.

*Primary Examiner*—Robert E. Bagwill
*Attorney, Agent, or Firm*—Ralph B. Pastoriza

[57] ABSTRACT

The method of root stock propagation involves positioning a collar loosely about a root stock grown from a bud grafted to a seedling wherein the bud is from a clone having desired characteristics. A fruiting scion may be grafted to the root stock such that after controlled growth, the seedling, root stock, collar and fruiting scion if attached, may be transplanted as a body. The root stock grows to a size inside the collar causing the collar to gradually constrict flow of nutrients to the seedling and promotes rooting of the root stock itself while gradually destroying its vascular connection to the seedling. The seedling finally disintegrates and there is left a properly rooted plant having the desired characteristics determined by the bud from the clone.

4 Claims, 6 Drawing Figures

METHOD OF ROOT STOCK PROPAGATION

This invention relates broadly to plant propagation and more particularly to an improved method of asexually propagating a root stock of a difficult-to-root plant species.

BACKGROUND OF THE INVENTION

Many plant species such as citrus trees and the like are subject to root rot disease and similar diseases. To combat this problem as well as provide trees of desired characteristics, a seedling of the tree in question has grafted to it a bud from a clone having disease immunity characteristics and growth characteristics which, if the same can be properly rooted, would solve the problem in that trees could be grown with the desired disease immunity and/or growth characteristics. Many problems, however, are encountered in attempting to root the root stock resulting from a graft, particularly in those instances where the plant species under consideration can be classified as difficult-to-root in the first place.

Conventional practice sometimes involves girdling the wood stock grown from the bud grafted to an initial seedling. This girdling involves scraping away part of the bark of the root stock and tightly surrounding the removed area with a wire or other physical restricting device which cuts off the flow of nutrients to the basic seedling from which the root stock is grown. It is hoped in this process to promote rooting of the root stock itself by the formation of roots above the girdling wire while simultaneously killing off the basic seedling and thus finally providing a plant having desired characteristics.

In almost all instances, the foregoing procedure of girdling has resulted in failure of the root stock itself to eventually take root and the problem of efficiently providing plants immune to certain diseases up to the time of the present invention still existed.

BRIEF DESCRIPTION OF THE PRESENT INVENTION

In accord with the present invention, an improved method is provided for the asexual propagation of a root stock of a difficult-to-root plant species, such as an avocado tree.

More particularly, the essence of the method of this invention resides in the positioning of a collar loosely about a root stock grown from a bud grafted to a seedling wherein the bud is from a clone having desired disease immunity and growth characteristics.

After the root stock has grown to a given size, a second grafting of a fruiting scion may be made and the initial seedling, root stock, collar and fruiting scion then transplanted as a body.

The root stock itself grows in size within the collar causing the collar to gradually constrict the flow of nutrients to the seedling and simultaneously promote rooting of the root stock itself, as the seedling is killed off. The seedling itself finally disintegrates and there is left a properly rooted plant having the desired characteristics.

The rooting in question results from the automatic action of the growth of the wood stock within the collar providing a controlled constricting of the base portion of the wood stock grafted to the seedling. The collar itself is designed to avoid any damage to the bark of the root stock.

BRIEF DESCRIPTION OF THE DRAWINGS

A better understanding of the method of this invention will be had by now referring to the accompanying drawings illustrating the rooting of an avocado tree having desired characteristics wherein.

DETAILED DESCRIPTION OF THE PREFERRED METHOD

As an example of the method of this invention, the asexual propagation of a root stock for an avocado tree will be described. However, it should be understood that the basic method steps are applicable to many other types of difficult-to-root plant species.

Figure 1:
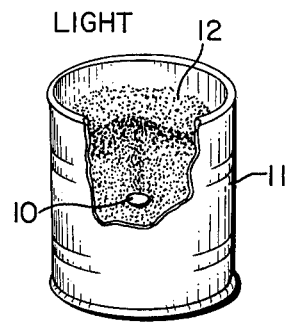
FIG. 1 is a broken away perspective view of a container in which a basic nursery seed is planted.

In accord with the method, and with reference to FIG. 1, a nurse seed 10 for an avocado tree is planted in a container 11 beneath soil 12, as shown. This nurse seed would be provided from an avocado tree subject to undesirable diseases such as root rot and the like and perhaps also having other undesirable growth characteristics. On the other hand, the seed itself is not difficult to root and grow into a seedling.

Figure 2:
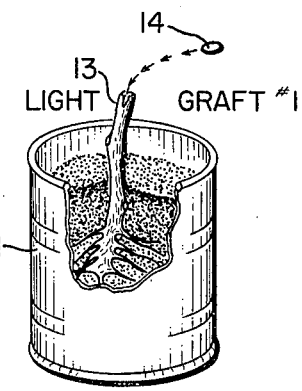
FIG. 2 is a view similar to FIG. 1 illustrating a subsequent time period after growth of the seed of FIG. 1 to provide a seedling to which a bud may be grafted in accord with certain steps of the method of this invention.

FIG. 2 illustrates the seedling at 13 after the seed 10 has been permitted to grow for a period of time; for example, eight weeks. The seedling is about the size of a pencil at this point.

In accord with a next step in the method, a bud is selected from a clone having immunity to given diseases and/or having desired growth characteristics. This bud is illustrated at 14 and as indicated by the arrows is grafted to the top or upper side of the seedling 13 to serve as a root stock scion.

Figure 3:
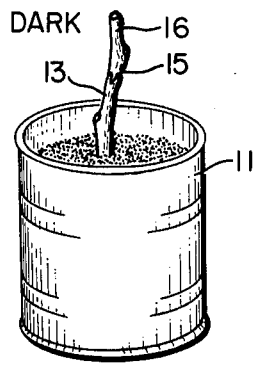
FIG. 3 illustrates a subsequent step in the development of a root stock resulting from the graft of FIG. 2.

After the grafting described in FIG. 2 has healed, a dark environment is provided for the root stock to grow in, partial growth being indicated in FIG. 3. About two or three weeks is all that is required for the graft to heal and when growth begins, the container 11 is placed in a dark environment as described until the root stock 16 has grown to a height of perhaps five inches. A typical time for this degree of growth is two weeks.

Figure 4:
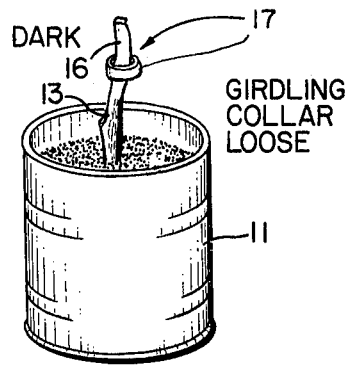
FIG. 4 illustrates the growth characteristics after a further period of time has passed and further illustrates another important step in the method.

Referring to FIG. 4, and in accord with a further step in the method, during the growth of the root stock 16 in the darkened environment, a collar 17 which may constitute a simple metal ring or piece of plastic tape preferably of sufficient width along the axial direction of the ring to provide a relatively large smooth inside surface area, is positioned about the base of the root stock.

Preferably, the collar has a larger inside diameter than the outside diameter of the root stock 16 so that the exterior root stock bark is in no way damaged by the collar nor is there any constriction on the root stock by the collar. In this respect, the inside diameter of the collar need only be very slightly larger than the outside diameter of the root stock and in fact the collar may fit snugly about the root stock but in no event should the fit be such as to cause in any way any damage to the bark of the root stock.

Figure 5:
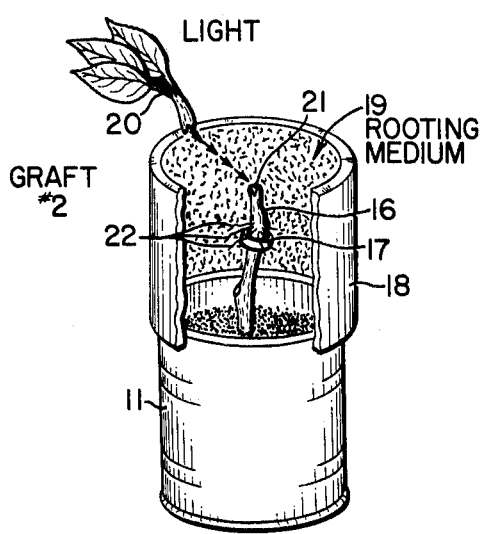
FIG. 5 schematically indicates a second grafting of a fruiting scion in accord with still further steps of the method; and, FIG. 6 shows the finalized plant after a transplating in the ground.

After insertion of the collar and further growth of the root stock 16 in the darkened environment as described in FIG. 4, the container 11 with the seedling 13, wood stock 16 and collar 17 is moved outside to a light environment and a retaining wall 18 is applied about the root stock and collar portion as shown in FIG. 5.

After the retaining wall 18 is in place, rooting mediums such as soil or dirt 19 is dropped into the area encompassed by the retaining wall to cover completely the seedling 13, collar 17, and a relatively large portion of the root stock 16 to shield the same from light.

The structure illustrated in FIG. 5 is then permitted to grow in a light environment until the root stock is mature — this period of time being generally from 6 to 24 weeks.

After the root stock 16 has reached maturity, a second graft may be made if desired with a fruiting scion 20 as indicated by the dashed lines, this graft being effected at the upper end of the root stock as at 21 in FIG. 5.

The grafted fruiting scion is permitted to grow for example up to six weeks.

During the growth of the root stock 16 as shown in FIG. 5, its diameter will increase and its length will increase resulting in the root stock expanding against the inside surface of the collar 17. There thus results a gradual constriction by the collar 17 as the diameter of the root stock 16 increases.

The girdling action which now ensues as a consequence of the collar 17 becoming in tighter and tighter engagement with the root stock promotes rooting from the root stock 16 itself as indicated at 22. Simultaneously, the collar gradually constricts the base of the root stock until the seedling 13 starts to starve and die.

Figure 6:
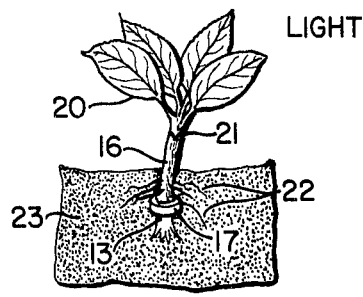

The plant of FIG. 5 after the second graft if used has healed and growth permitted as described is then ready for sale or for simple transplanting. Referring to FIG. 6, by way of example, the initial seedling 13, root stock 16, collar 17 and fruiting scion 20 if provided have been shown as transplanted in soil 23 so that continued growth will result in further rooting of the wood stock as indicated by the roots 22.

This further growth results in continued action by the collar in gradually constricting the base of the root to block nourishment to the seedling 13 so that this seedling disintegrates, all as described and as illustrated in FIG. 6.

The resulting plant shown in FIG. 6 is properly rooted and exhibits the desired immunity to the given diseases characteristic of the clone from which the selected bud used in the initial graft is derived. Moreover, other desired characteristics determined by the selection of the bud from the clone will be exhibited by the plant of FIG. 6.

With respect to the foregoing, the clone which in essence constitutes a reservoir of trees or group of plants genetically identical, would preferably have the characteristics of being immune to root rot and related diseases. As to the desired growth characteristics, the selection of the bud from the clone can be made to provide a resulting plant capable of growth in saline conditions. Also, the clone can constitute trees capable of proper growth in calcarious soil conditions. A desired size for the tree can also constitute one of the desired characteristics.

The underlying reason for success in proper rooting of difficult-to-root plants in accord with the method of this invention resides in the growth action of the root stock within the collar during and/or after transplantation. This growth, as stated, results in a very gradual constricting of the root stock at its base, thus eventually killing off the seedling which seedling itself can well be infectable by root rot. Moreover, during this gradual constricting action effected by the collar, rooting of the root stock itself is promoted above the collar as indicated in the drawings by the roots 22 in FIGS. 5 and 6.

A very high degree of success has been realized in the case of avocado trees by carrying out the foregoing described method. As stated, the method is, however, not restricted to avocado trees but can be applied to any of those situations in which it is desired to asexually propagate a root stock of a difficult-to-root plant species.

The term "loosely" as used herein and in the claims in describing the fit of the collar on the root stock is meant to include in its meaning a snug fit as well as a loose fit. By snug fit is meant an encircling of the root stock with the collar in contact over the enclosed area but of not sufficient pressure to cause any damage to the bark.

What is claimed is:

1. A method of root stock propagation of avocados which includes the steps of:
   a. providing a metal collar having sufficient width along the axial direction of the collar to provide a relatively large smooth inside surface area;
   b. positioning said collar loosely about a root stock grown from a bud grafted to an avocado seedling wherein the bud is from a clone and is selected from a species of avocado trees having desired characteristics including immunity to certain diseases and desired growth characteristics; and
   c. Controlling the growth for a given time after which the seedling, root stock and collar may be transplanted as a body, the root stock growing to a size inside the collar causing the collar to gradually constrict the flow of nutrients to said seedling and promote rooting of the root stock while gradually killing the seedling so that the seedling finally disintegrates and there is left a properly rooted avocado plant, having said desired characteristics.

2. A method of asexually propagating a root stock of an avocado plant species comprising the sequential steps of:
   a. growing an avocado nurse seed in a container of soil to provide an avocado seedling of given size;
   b. selecting from a species of avocado trees a bud from a clone having immunity to given diseases and having desired growth characteristics;
   c. grafting said bud to an exposed portion of said seedling to serve as a root stock scion;
   d. providing a dark environment after said graft has healed to permit said root stock to grow to a first given size;

e. providing a metal collar having sufficient width along the axial direction of the collar to provide a relatively large smooth inside surface therein;

e. positioning said collar about the base of said root stock so that the exterior root stock bark is in no way damaged by said collar nor is there any constriction on said root stock by said collar at the time it is positioned about said root stock;

g. continuing to grow said root stock in said dark environment to a second given size;

h. moving said container with said seedling, root stock and collar outside to a light environment and applying a retaining wall about said root stock and collar;

i filling said retaining wall with a rooting medium so that the retaining wall and medium shield the root stock and collar from light;

j. growing said root stock in said retaining wall until a given maturity is reached; and k. transplanting the entire initial seedling, root stock and collar in a desired location whereby continued growth results in rooting of said root stock, said collar gradually constricting the base of said root stock as a consequence of growth of said root stock within said collar until said seedling disintegrates so that the resulting plant is properly rooted and exhibits disease immunity and the desired characteristics determined by the selection of said bud from said clone.

3. The method of claim 2, in which said growth of said root stock to said first given size after said graft has healed being for a period of time of from two to four weeks, and in which said given maturity of said root stock is reached in from six to twenty-four weeks after said retaining wall has been applied.

4. The method of claim 2, including the step of grafting a fruiting scion onto said root stock after said given maturity is reached.

* * * * *